US012688599B2

(12) United States Patent
Ji et al.

(10) Patent No.: US 12,688,599 B2
(45) Date of Patent: Jul. 21, 2026

(54) DATA ACQUISITION APPARATUS AND METHOD FOR DETERMINING POSE THEREOF

(71) Applicant: Beijing Tusen Zhitu Technology Co., Ltd., Beijing (CN)

(72) Inventors: Pingyuan Ji, Beijing (CN); Jun Wu, Beijing (CN); Xiaokang He, Beijing (CN); Yajia Wang, Beijing (CN)

(73) Assignee: BEIJING OCGEN TECHNOLOGY CO., LTD., Beijing (CN)

( * ) Notice: Subject to any disclaimer, the term of this patent is extended or adjusted under 35 U.S.C. 154(b) by 601 days.

(21) Appl. No.: 18/181,438

(22) Filed: Mar. 9, 2023

(65) Prior Publication Data

US 2023/0306628 A1 Sep. 28, 2023

(30) Foreign Application Priority Data

Mar. 17, 2022 (CN) .......................... 202210266621.9

(51) Int. Cl.
*G06T 7/70* (2017.01)
*G01S 17/89* (2020.01)

(52) U.S. Cl.
CPC ................ *G06T 7/70* (2017.01); *G01S 17/89* (2013.01)

(58) Field of Classification Search
CPC ......... G06T 7/70; G01S 17/89; G01S 7/4808; G01S 7/4813; G01S 7/86; G01S 17/06
See application file for complete search history.

(56) References Cited

U.S. PATENT DOCUMENTS

| | | | |
|---|---|---|---|
| 2015/0269438 A1* | 9/2015 | Samarasekera ......... G06F 18/24 382/154 |
| 2018/0011196 A1 | 1/2018 | Pennecot et al. |
| 2019/0004159 A1 | 1/2019 | Lee et al. |
| 2020/0005489 A1* | 1/2020 | Kroeger ................... G06T 7/85 |
| 2020/0404197 A1 | 12/2020 | Gassend et al. |

(Continued)

FOREIGN PATENT DOCUMENTS

| | | |
|---|---|---|
| CN | 208444010 U | 1/2019 |
| CN | 208506253 U | 2/2019 |
| CN | 110869797 A | 3/2020 |

(Continued)

OTHER PUBLICATIONS

United Arab Emirates Ministry of Economy, Substantive Examination Result, Office Action Summary & Search Report for UA Appl. No. P6000542/2023, mailed on Nov. 25, 2024, 9 pages.

(Continued)

*Primary Examiner* — John R Wallace
(74) *Attorney, Agent, or Firm* — Perkins Coie LLP

(57) ABSTRACT

A data acquisition apparatus and method for determining a pose thereof. The disclosed data acquisition apparatus includes a mounting component and the sensor fixed to the mounting component. The sensor is oriented at a preset pose relative to the ground and configured to scan the surrounding environment of the data acquisition apparatus at a scanning frequency as a vehicle moves on the ground to obtain a sequence of point cloud data frames. The pose allows a coverage of an effective field of view of the sensor on the ground to be continuous across temporally neighboring frames in the sequence of point cloud data frames.

15 Claims, 2 Drawing Sheets

(56) References Cited

U.S. PATENT DOCUMENTS

2021/0049738 A1 *   2/2021   Sanchez-Monge ....... G06T 5/70

FOREIGN PATENT DOCUMENTS

| | | |
|---|---|---|
| CN | 210716817 U | 6/2020 |
| CN | 111361509 A | 7/2020 |
| CN | 111949943 A | 11/2020 |
| EP | 3703031 A1 | 9/2020 |
| JP | 2019027983 A | 2/2019 |
| WO | 2020/000141 A1 | 1/2020 |

OTHER PUBLICATIONS

European Patent Office, Partial European Search Report for EP Appl. No. 23160775.5, mailed Jul. 24, 2023, 18 pages.
Office Action from corresponding related Chinese Application No. 202210266621.9, Dec. 26, 2025.

* cited by examiner

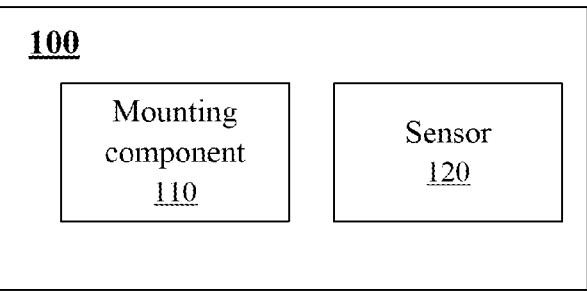
FIG. 1
200
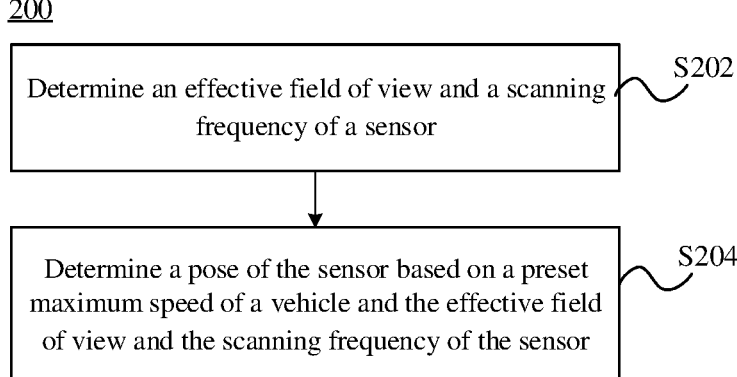
FIG. 2
FIG. 3

DATA ACQUISITION APPARATUS AND METHOD FOR DETERMINING POSE THEREOF

The present document claims priority to Chinese Patent Application No. 202210266621.9, titled "DATA ACQUISITION APPARATUS AND METHOD FOR DETERMINING POSE OF SENSOR," filed on Mar. 17, 2022, the content of which is incorporated herein by reference in its entirety.

TECHNICAL FIELD

The present document relates to the technical field of intelligent transportation, and in particular, to data acquisition technologies. Specifically, the present document relates to a data acquisition apparatus and a method for determining a pose of its sensor.

BACKGROUND

The ambient information may be acquired by using a data acquisition apparatus equipped with various sensors (for example, an image sensor, a location sensor, etc.). When the data acquisition apparatus is mounted on a vehicle, ambient information around the path along which the vehicle moves may be acquired using the data acquisition apparatus to generate corresponding map information.

The methods described in this section are not necessarily methods that have been previously conceived or employed. Unless otherwise indicated, it should not be assumed that any of the methods described in this section are considered prior art merely by virtue of their inclusion in this section. Similarly, the problems mentioned in this section should not be considered to have been identified in any prior art unless otherwise indicated.

SUMMARY

In an aspect of the present document, a data acquisition apparatus mounted on a vehicle is provided, including: a mounting component; and a sensor fixed to the mounting component, wherein the sensor is configured to scan the surrounding environment of the data acquisition apparatus at a scanning frequency as the vehicle moves on the ground to obtain a sequence of point cloud data frames, and the sensor is oriented at a preset pose relative to the ground to allow a coverage of an effective field of view of the sensor on the ground to be continuous across temporally neighboring frames in the sequence of point cloud data frames.

In another aspect of the present document, a method for determining a pose of a sensor mounted on a vehicle is provided, where the sensor is fixed on a mounting component mounted on the vehicle. The method includes determining an effective field of view and a scanning frequency of the sensor; and determining the pose based on a preset maximum speed of the vehicle and the effective field of view and the scanning frequency of the sensor, wherein the sensor is configured to scan the surrounding environment of the data acquisition apparatus at the scanning frequency as the vehicle moves on the ground to obtain a sequence of point cloud data frames, and the sensor is oriented at the pose relative to the ground to allow a coverage of the effective field of view of the sensor on the ground to be continuous across temporally neighboring frames in the sequence of point cloud data frames.

In yet another aspect of the present document, a data acquisition apparatus is provided, including: a housing; a bracket fixed to the housing and having an inclined surface; a long-range LIDAR mounted within the housing; a rotating LIDAR mounted on the inclined surface, wherein the inclined surface has an inclination to allow a coverage of an effective field of view of the rotating LIDAR to be continuous across neighboring frames in a sequence of point cloud data frames acquired by the rotating LIDAR as the data acquisition apparatus moves.

In still yet another aspect of the present document, an automobile system is provided, including an automobile, and the data acquisition apparatus mounted on the automobile as described herein.

According to one or more embodiments of the present document, by configuring a preset pose of the sensor, the coverage of the effective field of view of the sensor on the ground is allowed to be continuous across temporally neighboring frames in the sequence of point cloud data frames, so that the sensor is enabled to acquire complete ambient information around the vehicle as the data acquisition apparatus moves with the vehicle, preventing any missing or errors in data acquisition.

It is to be appreciated that what has been described in this section is not intended to identify key or critical features of the embodiments of the present document, nor is it intended to limit the scope of the present document. Other features of the present document will become apparent from the following description.

BRIEF DESCRIPTION OF THE DRAWINGS

The accompanying drawings, which are incorporated in and constitute a part of this description, illustrate embodiments and in conjunction with the description, serve to explain exemplary embodiments of the embodiments. The illustrated embodiments are for illustrative purposes only and do not limit the scope of the claims. Throughout the drawings, like reference numerals refer to similar but not necessarily identical elements.

FIG. 1 shows a block diagram of a data acquisition apparatus according to some embodiments of the present document;

FIG. 2 shows an exemplary flowchart of a method for determining a pose of a sensor mounted on a vehicle according to some embodiments of the present document;

FIG. 3 shows a schematic diagram of operating principles of a sensor mounted on a vehicle according to some embodiments of the present document;

DETAILED DESCRIPTION

Figure 4:
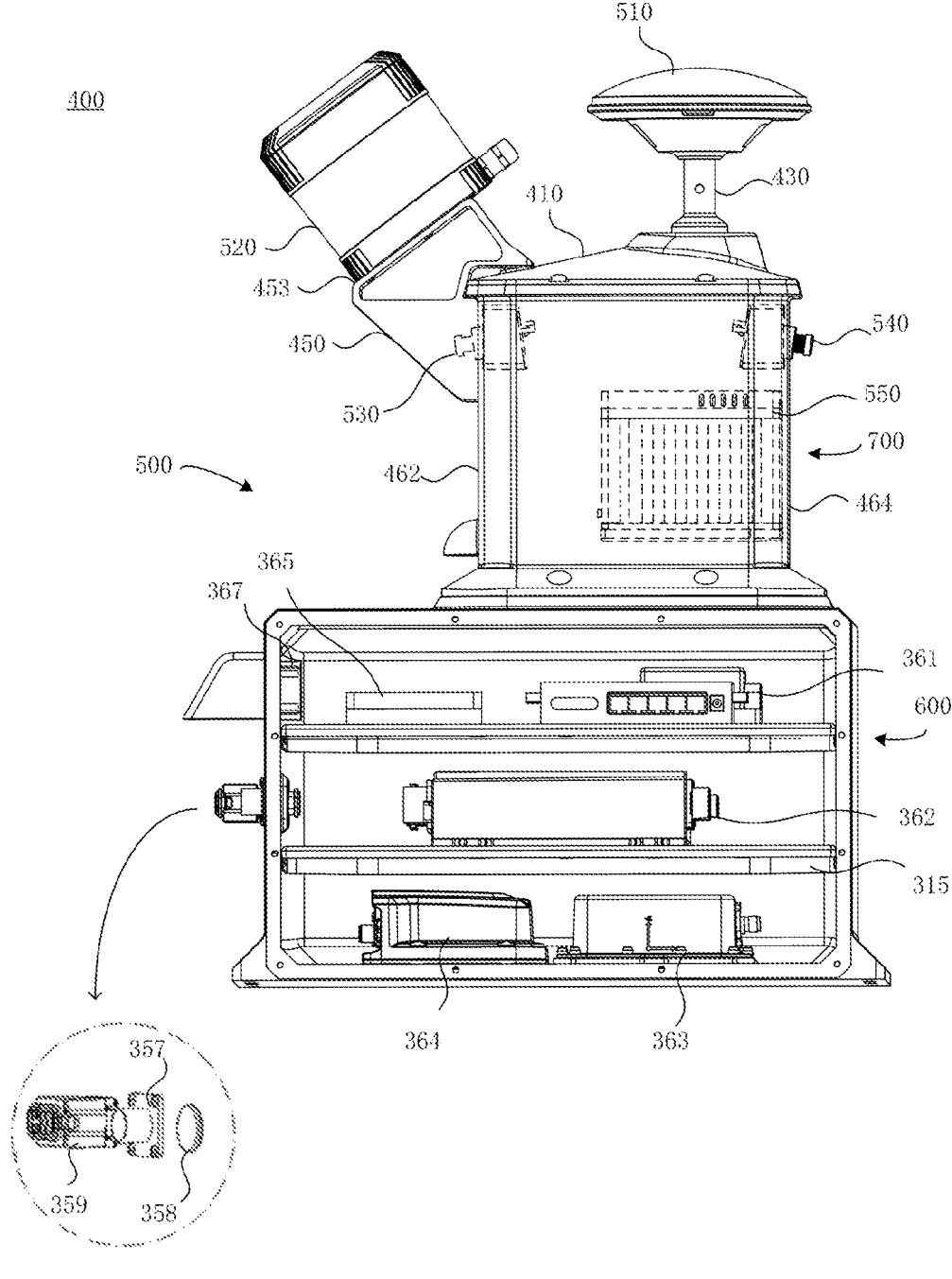
FIG. 4 shows a schematic diagram of a data acquisition apparatus according to some embodiments of the present document.

The exemplary embodiments of the present document are described below with reference to the accompanying drawings, including various details of the embodiments of the present document to facilitate understanding, which are to be considered as exemplary only. Accordingly, those skilled in the art will understand that various changes and modifications may be made to the embodiments described herein without departing from the scope of the present document. Also, descriptions of well-known functions and structures are omitted in the following description for clarity and conciseness.

In the present document, unless otherwise indicated, the terms "first," "second," and the like as used herein for the description of various elements are generally used distinguish one element from another and are not intended to limit the position, timing, or importance relationships of the elements. In some examples, a first element and a second element may refer to the same instance of the element, and in some cases, they may refer to different instances based on the description of the context.

The terminology used herein for various illustrated examples in the present document is for the purpose of describing particular examples only and is not intended to limit. Unless the context clearly dictates otherwise, the element may be singular and plural references if the number of an element is not specifically limited. Furthermore, the term "and/or" as used herein encompasses any and all possible combinations of the listed items.

Most of existing data acquisition apparatuses mounted on a vehicle are implemented by combination of various sensors. However, the level of integration of the sensors in the data acquisition apparatus is not high, the consistency of production is not guaranteed, and the installation is difficult. In addition, the data acquisition apparatus may acquire the ambient information through a LIDAR. When the vehicle on which the LIDAR is installed is an automobile, if the LIDAR is installed horizontally, it will be difficult to acquire information about the road or the high-position markers such as road lamps and road signs, etc. If the LIDAR is installed to be inclined in order to acquire the information of the high-position markers such as road lamps and road signs, etc., when the vehicle travels at a high speed, the LIDAR will acquire uneven point cloud of the ground or the acquisition for high-position road signs will be incomplete.

In order to solve the above problems, the embodiments of the present document provide a novel data acquisition apparatus. The principles of the present document will hereinafter be described with reference to the accompanying drawings.

FIG. 1 shows a block diagram of a data acquisition apparatus according to some embodiments of the present document.

As shown in FIG. 1, a data acquisition apparatus 100 includes a mounting component 110 and a sensor 120 fixed to the mounting component 110. When the data acquisition apparatus 100 is mounted on a vehicle (for example, a car, a truck, an aircraft, etc.), the sensor 120 is oriented at a preset pose relative to the ground and configured to scan the surrounding environment of the data acquisition apparatus 100 at a scanning frequency as the vehicle moves on the ground to obtain a sequence of point cloud data frames. The pose of the sensor 120 allows a coverage of an effective field of view of the sensor 120 on the ground to be continuous across temporally neighboring frames in the sequence of point cloud data frames.

As described above, in the case of the inclined installation of the LIDAR, a high speed of the vehicle will result in incomplete data of the ambient information acquired by the LIDAR. With the method provided by the present document, by configuring the sensor to the preset pose, continuous information of the surrounding environment can be always acquired as the vehicle shifts.

In some embodiments, the preset pose of the sensor 120 may include at least one of a mounting height of the sensor or an orientation (e.g. mounting inclination angle) of the sensor. In the case that the vehicle is an automobile, the mounting height may be a height of the sensor 120 relative to the ground, and the mounting inclination angle may be an angle of the sensor relative to a vertical direction. For example, when the sensor is fixed to the mounting component mounted on the vehicle, the mounting height may be the sum of a first mounting height of the mounting component 110 on the vehicle and a second mounting height of the sensor 120 on the mounting component 110. The first mounting height and the second mounting height may be fixed or variable. The mounting inclination angle may be an included angle between a mounting plane of the mounting component 110 (or the extending direction of the mounting plane) and the vertical direction.

In some embodiments, the preset pose of the sensor 120 may be determined based on a preset maximum speed of the vehicle and the effective field of view and the scanning frequency of the sensor 120. When the vehicle is traveling at the preset maximum speed, the pose of the sensor allows the coverage of the effective field of view of the sensor on the ground to be continuous across temporally neighboring frames in the point cloud data frame sequence. In this way, when the vehicle is traveling at a speed less than the preset maximum speed, i.e., at a lower speed, the extent of repetition of the data of the surrounding environment acquired by the sensor will be increased, thereby preventing incomplete information acquisition of the surrounding environment. A specific process of determining the preset pose of the sensor 120 based on the preset maximum speed of the vehicle and the effective field of view and the scanning frequency of the sensor 120 will be described below with reference to FIG. 2, and will not be described in detail herein.

The sensor 120 may be a LIDAR (for example, a rotating LIDAR) having a horizontal field of view of 360 degrees, and a vertical field of view of any value greater than 20 degrees and less than 120 degrees, or any value greater than 30 degrees and less than 90 degrees. For example, the vertical field of view may be 40 degrees.

For the LIDAR, in the range of the vertical field of view, the beam emitted by the LIDAR has a higher resolution in the central region of the field, so that the high-resolution part of the LIDAR may be referred to as a central dense region. Correspondingly, the beam emitted by the LIDAR has a lower resolution in the edge region of the field, so that the low-resolution part of the LIDAR may be referred to as a sparse region. The lower resolution of the beam in the sparse region corresponds to less information in the point cloud data. Therefore, in some examples, it can be considered that the effective field of view of the LIDAR only includes the central dense region and does not include the sparse region. In this case, the effective field of view of the sensor 120 may refer to the central dense region of the LIDAR.

In some embodiments, the central dense region and the sparse region of the LIDAR may be distinguished by a preset resolution. Within the vertical field of view, the region or field having a resolution greater than the preset resolution is the central dense region and other parts are sparse regions. The preset resolution may be, for example, a preset value (for example, one degree) or a preset fraction of a maximum resolution (for example, one-half of the maximum resolution). In some embodiments, the sensor 120 may be a first sensor. In this case, the data acquisition apparatus 100 may also include a large number of other sensors. The other sensors may be of the same type as the sensor 120 or of a different type than the sensor 120.

In some implementations, the data acquisition apparatus 100 may also include a second sensor and a third sensor. The second sensor may be an image sensor that may be configured to acquire an image of the surrounding environment of the vehicle, and the third sensor may be a location sensor that may be configured to acquire a geographic location of the vehicle. The specific forms of the image sensor and the location sensor are not defined herein. For example, the image sensor may be a charge coupled device (CCD) image sensor, a complementary metal oxide semiconductor (CMOS) sensor, or the like. The location sensor may be a global positioning system (GPS) sensor, a global navigation satellite system (GNSS) sensor, or the like.

In some implementations, the data acquisition apparatus 100 may also include a fourth sensor. The fourth sensor may be configured to acquire point cloud data in front of the vehicle. The fourth sensor may be a LIDAR. A maximum sensing range of the fourth sensor may be greater than a maximum sensing range of the first sensor. A horizontal field of view and a vertical field of view of the fourth sensor are smaller than the horizontal field of view and the vertical field of view of the first sensor, respectively. The horizontal field of view of the fourth sensor may be any value greater than 10 degrees and less than 30 degrees, or any value greater than 10 degrees and less than 20 degrees, and the vertical field of view may be any value greater than 10 degrees and less than 30 degrees, or any value greater than 10 degrees and less than 20 degrees.

The data acquisition apparatus 100 may also include a processing unit that may be configured to determine a geographic location of the vehicle based on the point cloud data acquired by the fourth sensor. In some examples, the processing unit may be a local processing unit integrated within the data acquisition apparatus 100. In other examples, the processing unit may be a remote processing unit relative to the data acquisition apparatus 100. The data acquisition apparatus 100 may include a data communication component for transmitting the point cloud data acquired by the fourth sensor to the processing unit and receiving a corresponding processing result from the processing unit.

The determination of the geographic location of the vehicle based on the point cloud data acquired by the fourth sensor can be achieved by the following steps of: determining a first geographic location of the vehicle at a first moment, determining first point cloud data of the environment in front of the vehicle acquired by the fourth sensor at the first moment, determining second point cloud data of the environment around the vehicle acquired by the first sensor at a second moment, and determining a second geographic location of the vehicle at the second moment based on the first geographic location by registering the first point cloud data with the second point cloud data.

Among others, the first geographic location of the vehicle may be determined using the geographic location acquired at the first moment by the location sensor (for example, the aforementioned third sensor) in the data acquisition apparatus. When the vehicle is located in an open area, the location sensor may receive a locating signal with good quality, so that the first geographic location may be more accurately determined.

However, in some cases, if the vehicle travels to a location where the locating signal is weak (for example, in a tunnel), it may be difficult to continue to determine the geographic location of the vehicle from the locating signal acquired by the location sensor. In this regard, in the method provided by the present document, the fourth sensor is provided for acquiring point cloud data indicative of ambient information in front of the vehicle, so as to assist in locating of the vehicle.

As described above, when the reception of the locating signal is good at the first moment, the locating signal can be used to determine an accurate first geographic location of the vehicle. Meanwhile, at the first moment, the first point cloud data of the environment in front of the vehicle may also be acquired using the fourth sensor, thereby obtaining ambient information within a preset distance in front of the first geographic location. Next, the vehicle continues to travel forwards, and point cloud data of the environment around the vehicle is continuously acquired using the first sensor during the travel. The point cloud data acquired by the first sensor may be registered with the first point cloud data acquired by the fourth sensor at the first moment. When the registration of the second point cloud data acquired by the first sensor at the second moment with the first point cloud data acquired by the fourth sensor at the first moment is successful, it can be considered that at the second moment, the vehicle have arrived at the second geographic location which is associated with the point cloud acquired by the fourth sensor at the first moment and is at a first distance from the first geographic location. By using the first point cloud data acquired by the fourth sensor, the orientation and distance of an ambient object (for example, a road sign, etc.) at the second geographic location relative to the first geographic location can be determined. Thus, the second geographic location of the vehicle at the second moment may be determined based on the first geographic location and the first distance. In this way, the second geographic location can be determined more accurately even if the data acquisition apparatus is unable to acquire the locating signal with good quality at the second moment.

FIG. 2 shows an exemplary flowchart of a process 200 for determining a pose of a sensor mounted on a vehicle according to some embodiments of the present document.

As shown in FIG. 2, in step S202, an effective field of view and a scanning frequency of the sensor are determined. Among others, the sensor may be a rotating LIDAR. The effective field of view of the sensor may be the central dense region of the rotating LIDAR. The LIDAR may acquire point cloud data of ambient information around a vehicle at a preset scanning frequency.

In step S204, a pose of the sensor is determined based on a preset maximum speed of the vehicle and the effective field of view and the scanning frequency of the sensor.

The sensor is oriented at the determined pose relative to the ground and configured to scan the surrounding environment of the data acquisition apparatus at the scanning frequency as the vehicle moves on the ground to obtain a point cloud data frame sequence, and the pose allows a coverage of the effective field of view of the sensor on the ground to be continuous across temporally neighboring frames in the point cloud data frame sequence.

FIG. 3 shows a schematic diagram of operating principles of a sensor mounted on a vehicle according to some embodiments of the present document.

As shown in FIG. 3, a sensor 310 (for example, a rotating LIDAR) is mounted on a vehicle (for example, an automobile). The mounting height of the sensor 310 is h relative to the ground on which the vehicle moves, and a line 320 and a line 330 define a range of the effective field of view of the sensor 310. The included angle between the line 320 and the vertical direction is θ1, and the included angle between the line 330 and the vertical direction is θ2. It is also assumed that the effective field of view of the sensor 310 is longitudinally symmetrical relative to an axis 350 of the sensor 310. As shown in FIG. 3, a projecting distance of the effective field of view of the sensor on the ground is L. Based on the geometric relationship, it can be obtained that:

$$L = h \times (\tan \theta 1 - \tan \theta 2) \tag{1}$$

7

After a period of time t, the sensor 310 moves with the vehicle to the position of the dashed line in FIG. 3. In order to make the coverage of the effective field of view of the sensor on the ground continuous across temporally neighboring frames in the point cloud data frame sequence, when the period of time t is equal to an acquisition interval $\Delta t$ between neighboring frames in the point cloud data frame sequence, the travel distance of the vehicle should be less than or equal to L. $\Delta t$ may be determined based on the scanning frequency of the sensor. Therefore, the maximum traveling speed of the vehicle may be determined as:

$$V\max=L/\Delta t=(h\times(\tan\theta1-\tan\theta2))/\Delta t \tag{2}$$

Among others, the mounting inclination angle of the sensor may be an angle of the sensor relative to the vertical direction, namely an angle of a central direction of the effective field of view of the sensor relative to the vertical direction. Therefore, the mounting inclination angle of the sensor may be determined as:

$$\alpha=(\theta1+\theta2)/2 \tag{3}$$

Therefore, in the case where the maximum speed of the vehicle is the preset maximum speed Vmax, the relationship between the mounting height and the mounting inclination angle of the sensor may be determined based on Formula (2) and Formula (3). Furthermore, in the case where one parameter among the mounting height and the mounting inclination angle of the sensor is determined, the value of the other parameter may be determined. For example, taking a sensor mounted on the top of the automobile as an example, in the case where the mounting height of the sensor is not adjustable, since the height difference between the top of the automobile and the ground is fixed, it is possible to determine the mounting height H between the sensor mounted on the top of the automobile and the ground. Furthermore, the preset maximum speed Vmax of the automobile may be determined based on the speed limit information of a road segment where the automobile is expected to travel. Given the mounting height H, the preset maximum speed Vmax of the automobile and the effective field of view and the scanning frequency of the sensor, the appropriate mounting inclination angle $\alpha$ of the sensor can be determined. As another example, similar to the above-described method, it is also possible to determine the appropriate mounting height H of the sensor when the mounting inclination angle $\alpha$ is determined by the mounting component of the sensor. In this way, the automobile can travel at the preset maximum speed without causing any missing in data of the ambient information acquired by the sensor.

When the sensor is mounted on the automobile at the pose with the mounting height H and the mounting inclination angle $\alpha$, a maximum traveling speed of the automobile can be determined based on Formula (2) and Formula (3) above. Further, when it is detected that the current traveling speed of the automobile is higher than the maximum traveling speed determined based on Formula (2) and Formula (3), a prompt message may be issued to a user to prevent the automobile from traveling for a long time at a speed higher than the maximum traveling speed at which the ambient information can be completely acquired, resulting in failure in acquiring effective ambient information of the road segment.

For example, based on Formula (2), when the sensor is mounted on the automobile at the pose with the mounting height H and the mounting inclination angle $\alpha$, the maxi-

8 mum traveling speed $V_m$ of the automobile that can ensure the integrity of ambient information acquired by the sensor is determined as follows:

$$V_m=H\times(\tan(\alpha+\beta)-\tan(\alpha-\beta))/\Delta t \tag{4}$$

where H is the mounting height of the sensor, $\alpha$ is the mounting inclination angle of the sensor, $\beta$ is half of the effective field of view of the sensor, namely $\beta=(\theta1-\theta2)/2$, and $\Delta t$ is the acquisition interval between neighboring frames in the point cloud data frame sequence determined based on the scanning frequency of the sensor.

With a calculation result of Formula (4), a prompt message may be sent to the user to inform the user of the maximum traveling speed of the automobile at which continuous ambient information around the automobile can be acquired, and prompt the user to control the traveling speed of the automobile within a range of less than or equal to $V_m$. In some embodiments, the data acquisition apparatus may also communicate with the automobile to obtain a traveling speed of the automobile, and when the data acquisition apparatus determines that the traveling speed of the automobile is greater than $V_m$, the data acquisition apparatus sends a message to the automobile to prompt the user to control the traveling speed of the automobile within the range of less than or equal to $V_m$. Alternatively, when the traveling speed of the automobile is greater than $V_m$, the data acquisition apparatus sends a message to an autonomous driving system or an assisted driving system of the automobile such that the autonomous driving system or the assisted driving system of the automobile controls the traveling speed of the automobile within the range of less than or equal to $V_m$.

In other examples, it may provide for the sensor a deformable mechanical structure to change at least one of the mounting height or the mounting inclination angle of the sensor. For example, when it is detected that the traveling speed of the automobile is higher than the maximum traveling speed at which complete ambient information can be acquired, at least one of the mounting height or the mounting inclination angle of the sensor can be changed by operating the above-mentioned mechanical structure so that the sensor at a changed pose can acquire the complete environment information at the current traveling speed of the automobile, namely the changed pose allows the coverage of the effective field of view of the sensor on the ground to be continuous across temporally neighboring frames in the point cloud data frame sequence.

FIG. 4 shows a schematic diagram of a data acquisition apparatus according to some embodiments of the present document. The data acquisition apparatus 100 mounted on the vehicle described in FIG. 1 may be implemented using a data acquisition apparatus 400 shown in FIG. 4.

As shown in FIG. 4, the data acquisition apparatus 400 includes a mounting component 500 that may include a mechanical structure for mounting sensors to sense ambient information of the data acquisition apparatus (or an automobile on which the data acquisition apparatus is mounted). For example, the sensors mounted on the mounting component may include an inertial measurement unit (IMU), a GNSS receiver (for example, a GPS receiver), a radio detection and ranging apparatus (RADAR), a light detection and ranging system (LIDAR), an acoustic sensor, an ultrasonic sensor, and an image acquisition device (for example, a camera). The sensors may be driven individually or collectively to update the location, orientation, or both of one or more sensors.

The IMU may include a combination of sensors (for example, an accelerator and a gyroscope) for sensing locational and directional changes of the data acquisition apparatus (or the automobile on which the data acquisition apparatus is mounted) based on inertial acceleration. The GNSS receiver may be any sensor for estimating a geographic location of the data acquisition apparatus (or the automobile on which the data acquisition apparatus is mounted). It is to be noted that the GNSS receiver may include the GPS receiver, a BeiDou navigation satellite system receiver, or a Galileo satellite navigation system receiver. RADAR may use radio signals to sense objects in the environment in which the data acquisition apparatus (or the automobile on which the data acquisition apparatus is mounted) is located. In some embodiments, in addition to sensing objects, the RADAR may also be used to sense the speed and moving direction of an object approaching the data acquisition apparatus (or the automobile on which the data acquisition apparatus is mounted). The LIDAR may be any sensor that uses light to sense objects in the environment in which the data acquisition apparatus (or the automobile on which the data acquisition apparatus is mounted) is located. In some embodiments, the LIDAR may include a laser source, a laser scanner, and a detector. The data acquisition apparatus may include the image acquisition device for capturing a plurality of images of the environment in which the data acquisition apparatus (or the automobile on which the data acquisition apparatus is mounted) is located.

The mounting component 500 may include a first housing 600 and a second housing 700. A bracket 450 may be fixed to the second housing 700, and the bracket 450 may have an inclined surface. A rotating LIDAR (for example, a LIDAR 520 shown in FIG. 4) may be mounted on the inclined surface of the bracket 450, and a long-range LIDAR (for example, a LIDAR 550 shown in FIG. 4) may be mounted within the second housing. The inclination of the inclined surface of the bracket 450 allows the coverage of the effective field of view of the rotating LIDAR to be continuous across neighboring frames in a point cloud data frame sequence acquired by the rotating LIDAR as the data acquisition apparatus 400 moves. When the aforementioned data acquisition apparatus 100 is implemented using the data acquisition apparatus 400 shown in FIG. 4, the mounting inclination angle α of the LIDAR 520 may be determined based on the inclination of an inclined mounting surface 453 of the bracket 450. In some embodiments, the bracket 450 includes a deformable mechanical structure to change at least one of the mounting height or the mounting inclination angle of the LIDAR 520.

An antenna 510 such as GNSS or the like is mounted on a bracket 430. A cable (not shown) may pass through an opening in an upper cover 410 to connect the antenna 510 with an associated device (for example, a GNSS receiver) in the mounting component 500.

The bracket 450 may be at least partially fixed to a side plate 462 of the second housing 700 and at least partially fixed to the upper cover 410 of the second housing 700. Such a design facilitates miniaturization of the data acquisition apparatus. A sensor, such as the LIDAR 520, may be mounted on the bracket 450. The aforementioned sensor 120 or the sensor 310 may be implemented using the LIDAR 520. The bracket 450 may have the inclined mounting surface 453, and the LIDAR 520 may be mounted on the inclined mounting surface 453 of the bracket 450. In some embodiments, the inclination of the inclined mounting surface 453 and the height of the bracket 430 may be set such that light emitted from the LIDAR mounted on the inclined mounting surface 453 does not reach the bracket 430 and the antenna 510 mounted on the bracket 430, thus preventing interference of the bracket 430 and the antenna 510 on the bracket 430 with the LIDAR 520. A cable (not shown) may pass through an opening in the upper cover 410 to connect the LIDAR 520 with an associated device (for example, a control device 362) in the mounting component 500.

A sensor may also be mounted inside the second housing 700. For example, an image acquisition device and a LIDAR or the like may be mounted in the second housing 700. As shown in FIG. 4, an image acquisition module 530 including an image acquisition device is fixed to the side plate 462, and a portion of the image acquisition device (for example, a lens component) passes through an opening of the side plate 462 and the bracket 450 and is located below the LIDAR 520. An image acquisition module 540 including an image acquisition device is mounted on a side plate 464, and a portion of the image acquisition device (for example, a lens component) passes through an opening of the side plate 464. Such arrangement of the image acquisition device facilitates miniaturization of the data acquisition apparatus 400.

It is to be noted that in FIG. 4, the image acquisition module 530 is obscured by the bracket 450 and the second housing 700 and is therefore shown in dashed lines, and similarly in FIG. 4, a portion of the image acquisition module 540 is obscured by the second housing 700 and is also shown in dashed lines.

It is to be noted that while only two image acquisition modules are shown in FIG. 4, those skilled in the art will appreciate that there may be more or fewer image acquisition modules, for example, two, three or more image acquisition modules may be mounted on the side plate 462, and similarly, two, three or more image acquisition modules may be mounted on the side plate 464. In other embodiments, one or more image acquisition modules may be mounted on other side plates of the second housing (such as the side plate perpendicular to the side plate 462 or the side plate 464). In other embodiments, one or more image acquisition modules may be mounted on the first housing.

The LIDAR 550 may be mounted or fixed to the side plate 464. In FIG. 4, the LIDAR 550 is obscured by the second housing 700 and is therefore shown in dashed lines. An emission port of the LIDAR 550 is aligned with the opening of the second housing 700 and located below the image acquisition module 540. It is to be noted that the opening of the second housing may have a different shape, such as a square, a rectangle, a circle, or an ellipse, depending on the shape of the emission port of the LIDAR 550.

The LIDAR 550 may be mounted on a mounting plate fixed to the second housing 700. In some embodiments, the LIDAR 550 may be fixed to the mounting plate by spacers, and the mounting plate may have a ring baffle to prevent the LIDAR 550 from falling off when the automobile shakes. A side of the baffle may have an opening, and when the LIDAR 550 is mounted on the mounting plate, the opening of the baffle is aligned with the emission port of the LIDAR 550.

According to some embodiments of the present application, the field of view (FOV) of the LIDAR 550 is less than the field of view of the LIDAR 520. For example, the LIDAR 520 may have a horizontal field of view of 360 degrees (when the LIDAR 520 is positioned horizontally), and the vertical field of view of the LIDAR 520 may be less than 60 degrees, or less than 45 degrees, or less than 30 degrees. When mounted on the inclined mounting surface 453 of the bracket 450, the LIDAR 520 has the field of view of 360 degrees in a plane parallel to the inclined mounting surface 453. Each of the horizontal and vertical fields of view of the LIDAR 550 may be less than 30 degrees, or may be less than 20 degrees.

It is to noted that while only two LIDARs are shown in FIG. 4, those skilled in the art will appreciate that there may be more or fewer LIDARs, that the LIDARs may have the same or different fields of view, may be mounted on different side plates of the second housing, or may be mounted on the first housing.

The data acquisition apparatus 400 also includes a communication device 361, a heat dissipating device 367, a control device 362, and a locating device, which are all mounted in the first housing 600. Some of these devices may be mounted on a bottom plate or side plate of the first housing 600 and others may be mounted on a mounting plate 315. For example, as shown in FIG. 4, the communication device 361 is mounted on one mounting plate, the control device 362 is mounted on another mounting plate, the locating device is mounted on the bottom plate of the first housing 600, and the heat dissipating device 367 is mounted on a side plate of the first housing 600 close to an air vent. The heat dissipating device 367 may be, for example, a fan. The locating device may include, for example, a GNSS receiver 364 and an IMU 363. In some embodiments, a fuse 365 is also mounted in the first housing 600. Components such as a power supply interface 359, a data transmission interface 357, and a switch 358 may also be installed on the opening of the side plate of the first housing 600. The arrangement of these components is shown by a dotted circle in FIG. 4. The power supply interface 359 is used to connect to an external power supply to provide power to various devices of the data acquisition apparatus 400. The data transmission interface 357 may provide wired communication for associated devices of the data acquisition apparatus 400 with other apparatuses or devices. The switch 358 is used to control whether the data acquisition apparatus 400 is in an on or off state, and may have a display function, for example, by displaying different colors to indicate the on or off state.

The communication device 361 may provide a means for one or more devices of the data acquisition apparatus 400 to communicate with each other, or may provide a means for the data acquisition apparatus 400 to communicate with other surrounding apparatus. In some embodiments, the communication device 361 may communicate with one or more devices or apparatuses either directly or through a communication network. The communication device 361 may be, for example, a wireless communication device. For example, the communication device may use 3G cellular communication (for example, CDMA, EVDO, GSM/GPRS) or 4G cellular communication (such as WiMAX or LTE), and may also use 5G cellular communication. Alternatively, the communication device may communicate with a wireless local area network (WLAN) (for example, using WIFI®). In some embodiments, the communication device 361 may communicate directly with one or more devices or other surrounding apparatus, for example, using infrared ray, Bluetooth®, or ZIGBEE. Other wireless protocols, such as various vehicle communication systems, are also within the scope of the present document. For example, the communication device may include one or more dedicated short-range communication (DSRC) apparatuses, V2V apparatuses, or V2X apparatuses that perform public or private data communication with automobiles and/or roadside stations. In some embodiments, the communication device may communicate with an automobile (namely, an automobile on which a data acquisition apparatus is mounted) to obtain the traveling speed of the automobile.

The control device 362 can control some or all of the functions of the data acquisition apparatus 400. In some embodiments, the control device 362 functions to combine data from sensors, such as data from the GNSS receiver, RADAR, LIDAR, the image acquisition device and other data to analyze ambient information of the surrounding environment of the data acquisition apparatus 400 (or the automobile on which the data acquisition apparatus is mounted) and generate map data.

The map data generated by the data acquisition apparatus 400 may include:

road data: data on attributes such as road conditions, the color of lane line, the type of lane line, and the slope and curvature of lane, etc.;

information about fixed objects of road: such as traffic signs, traffic lights, lane height limit, sewage outlets, obstacles, guard rails, the type of road edge, roadside landmarks, etc.;

dynamic traffic information: such as road congestion, road construction, traffic accidents, traffic control situations, weather situations, etc.;

information about objects around the road: such as buildings and vegetation around roads, etc.

The control device 362 may include a non-volatile computer-readable medium and at least one processor (which may include at least one microprocessor) that executes processing instructions (i.e., machine-executable instructions) stored in the non-volatile computer-readable medium (such as a data storage apparatus or a memory). The processing unit described above may be implemented by a processor. The control device 362 may also be a plurality of control devices that control the various devices of the data acquisition apparatus 400 in a distributed manner. In some embodiments, the memory may contain processing instructions (such as program logic) that are executed by the processor to perform various functions of the data acquisition apparatus 400. Data from the control device 362 and sensors may be transmitted to other apparatuses or devices via the communication device 361 or via the data transmission interface 357.

The memory may also include other instructions, including instructions for data transmission, instructions for data reception, instructions for interaction, or instructions for controlling sensors.

In addition to storing processing instructions, the memory may store a variety of information or data, such as image processing parameters, road maps, etc. Such information may be used by the control device 362 to analyze ambient information of the surrounding environment of the data acquisition apparatus 400 (or the automobile on which the data acquisition apparatus is mounted).

According to the data acquisition apparatus 400 of the present application, the integration of the sensors, antennas, control device, and communication device, etc. in the mounting component 500 simplifies the wiring between the devices as compared with the conventional art in which the devices are dispersed at different positions of the automobile, thereby reducing malfunctions due to complex wiring. Also, because the sensors is fixed to the mounting component 500, when the data acquisition apparatus 400 is migrated from one automobile to another, there is no need to readjust the relative orientations or angles of sensors and the antennas, etc. saving a lot of time and labor.

Although embodiments or examples of the present document have been described with reference to the accompanying drawings, it is to be understood that the above-described methods, systems and devices are merely exemplary embodiments or examples, and that the scope of the present invention is not limited by these embodiments or examples, but is defined only by the scope of the granted claims and their equivalents. Various elements of the embodiments or examples may be omitted or replaced with equivalents thereof. Furthermore, steps may be performed in an order other than that described in this document. Further, various elements of the embodiments or examples may be combined in various ways. Importantly, with the evolution of the technology, many elements described herein may be replaced by equivalent elements appearing after the present document.

What is claimed is:

1. A data acquisition apparatus mounted on a vehicle, comprising:
 a mounting component; and
 a sensor fixed to the mounting component,
 wherein the sensor is configured to scan a surrounding environment of the data acquisition apparatus at a scanning frequency as the vehicle moves on ground to obtain a sequence of point cloud data frames, and
 wherein the sensor is oriented at a preset pose relative to the ground to allow a coverage of an effective field of view of the sensor on the ground to be continuous across temporally neighboring frames in the sequence of point cloud data frames;
 wherein the preset pose is determined based on a preset maximum speed of the vehicle, the effective field of view, and the scanning frequency of the sensor.

2. The data acquisition apparatus of claim 1, wherein the preset pose comprises a mounting height of the sensor and an orientation of the sensor.

3. The data acquisition apparatus of claim 2, wherein the vehicle is an automobile, the mounting height is a height of the sensor relative to the ground, and a mounting inclination angle is an angle of the sensor relative to a vertical direction.

4. The data acquisition apparatus of claim 1, wherein the sensor is a rotating LIDAR, and the effective field of view corresponds to a central dense region of the rotating LIDAR.

5. The data acquisition apparatus of claim 1, wherein the sensor is a first sensor, and the data acquisition apparatus further comprises:
 a second sensor configured to acquire an image of the surrounding environment of the vehicle; and
 a third sensor configured to acquire a geographic location of the vehicle.

6. The data acquisition apparatus of claim 1, wherein the sensor is a first sensor, and the data acquisition apparatus further comprises:
 a fourth sensor configured to acquire point cloud data of environment in front of the vehicle; and
 a processing unit configured to determine a geographic location of the vehicle based on the point cloud data acquired by the fourth sensor.

7. The data acquisition apparatus of claim 6, wherein the determining the geographic location of the vehicle based on the point cloud data acquired by the fourth sensor, comprises:
 determining a first geographic location of the vehicle at a first moment;
 determining first point cloud data of the environment in front of the vehicle acquired by the fourth sensor at the first moment;
 determining second point cloud data of environment around the vehicle acquired by the first sensor at a second moment; and
 determining a second geographic location of the vehicle at the second moment based on the first geographic location by registering the first point cloud data with the second point cloud data.

8. The data acquisition apparatus of claim 7, wherein the determining the first geographic location of the vehicle at the first moment, comprises:
 acquiring the first geographic location using a location sensor at the first moment.

9. The data acquisition apparatus of claim 6, wherein the fourth sensor is a forward-facing long-range LIDAR.

10. A vehicle system, comprising a vehicle, and the data acquisition apparatus of claim 1.

11. A method for determining a pose of a sensor mounted on a vehicle, wherein the sensor is fixed to a mounting component mounted on the vehicle, the method comprising:
 determining an effective field of view and a scanning frequency of the sensor; and
 determining the pose based on a preset maximum speed of the vehicle and the effective field of view and the scanning frequency of the sensor,
 wherein the sensor is configured to scan a surrounding environment of a data acquisition apparatus at the scanning frequency as the vehicle moves on ground to obtain a sequence of point cloud data frames, and
 wherein the sensor is oriented at the pose relative to the ground to allow a coverage of the effective field of view of the sensor on the ground to be continuous across temporally neighboring frames in the sequence of point cloud data frames.

12. The method of claim 11, wherein the pose comprises a mounting height of the sensor and a mounting inclination angle of the sensor.

13. The method of claim 12, wherein the vehicle is an automobile, the mounting height is a height of the sensor relative to the ground, and the mounting inclination angle is an angle of the sensor relative to a vertical direction.

14. The method of claim 11, wherein the sensor is a rotating LIDAR, and the effective field of view corresponds to a central dense region of the rotating LIDAR.

15. The method of claim 11, wherein the sensor is a LIDAR and has a resolution within the effective field of view greater than a preset value.

* * * * *